UNITED STATES PATENT OFFICE.

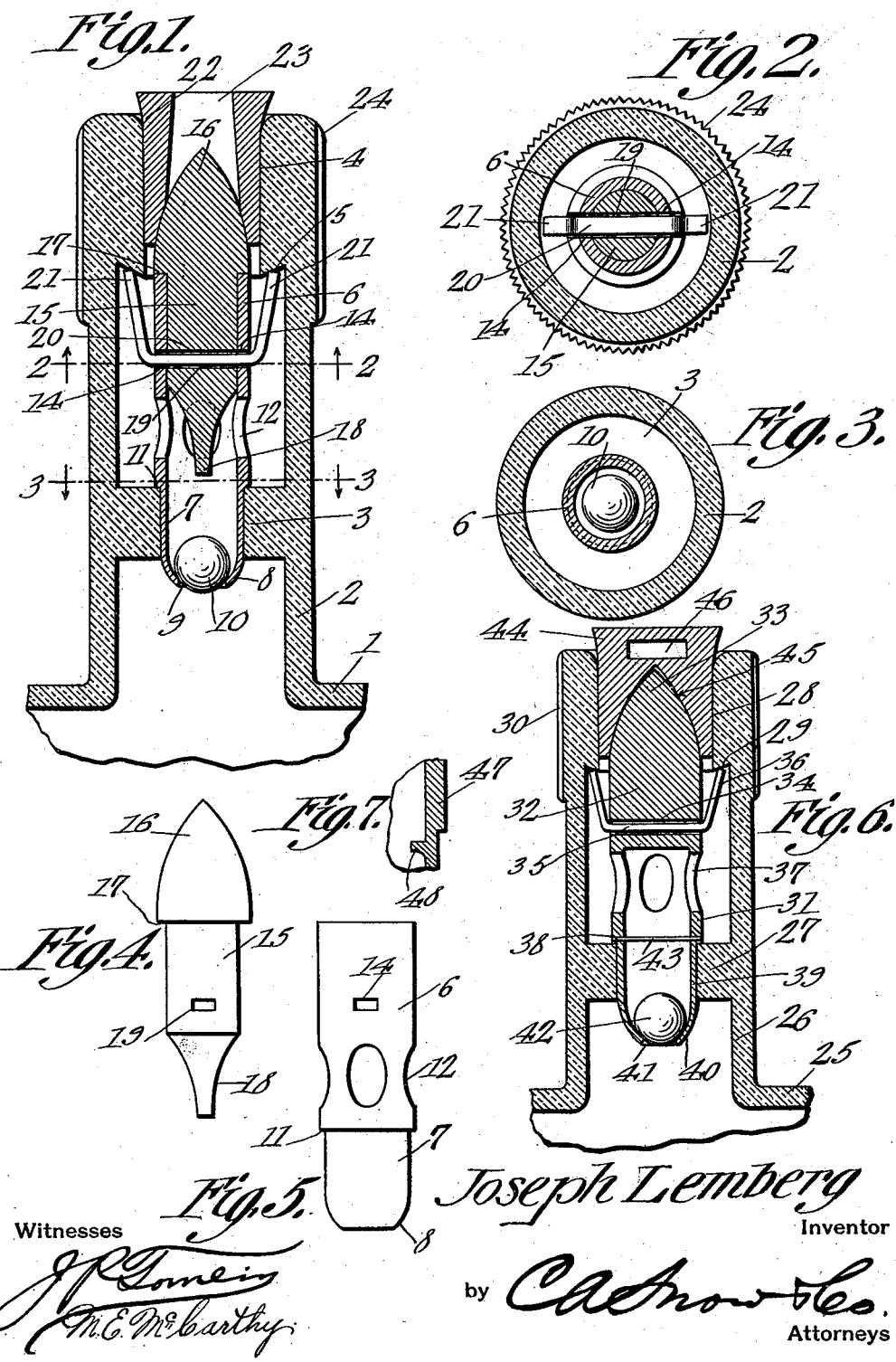

JOSEPH LEMBERG, OF CHARLESTOWN, MASSACHUSETTS.

NON-REFILLABLE BOTTLE.

1,142,445.  Specification of Letters Patent.  Patented June 8, 1915.

Application filed August 6, 1914. Serial No. 855,475.

*To all whom it may concern:*

Be it known that I, JOSEPH LEMBERG, a subject of the Czar of Russia, residing at Charlestown, in the county of Suffolk and State of Massachusetts, have invented a new and useful Non-Refillable Bottle, of which the following is a specification.

The device forming the subject matter of this application is a non-refillable bottle, and one object of the present invention is to improve the construction of the casing which contains the movable valve.

Another object of the invention is to provide novel means whereby, at once, the constituent portions of the valve casing may be held together and the casing be retained in the receptacle.

Another object of the invention is to provide novel means whereby the bottle cannot be filled by liquid applied under pressure through a tube which surrounds the exterior of the mouth of the receptacle.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing: Figure 1 shows in vertical longitudinal section, a portion of the receptacle embodying the present invention; Fig. 2 is a cross section on the line 2—2 of Fig. 1; Fig. 3 is a cross section on the line 3—3 of Fig. 1; Fig. 4 is an elevation depicting the plug portion of the valve casing; Fig. 5 is a side elevation depicting the cage portion of the valve casing; Fig. 6 is a longitudinal section showing a modified form of the invention; Fig. 7 is a fragmental longitudinal section showing a still further modification in the invention.

In carrying out the present invention there is provided a receptacle 1, preferably made of glass or the like, the receptacle 1 including a neck 2. Intermediate its ends, the neck 2 is equipped with a projecting primary rib 3. Adjacent its mouth, the neck 2 of the receptacle 1 is provided with a secondary rib 4, the inner edge of which is undercut as shown at 5, to define a shoulder.

The invention includes a valve casing, the casing being a composite structure. In the present instance, the casing includes a tubular cage 6 having a reduced inner end 7, the end 7 being contracted as shown at 8, at its inner extremity. In the contracted inner portion 8 of the valve cage there is an opening 9 in which is seated a valve preferably in the form of a ball 10. At the point where the cage 6 is reduced to form the end 7, there occurs a shoulder 11. The inner end 7 of the cage fits closely within the primary rib 3 and the shoulder 11 in the cage engages the outer face of the rib 3, thereby to prevent inward movement of the cage. In the side wall of the cage 6 and outwardly of the primary rib 3, the cage is equipped with lateral openings 12. In the side walls of the cage, alined, oppositely disposed openings 14 are formed.

The valve casing includes a plug 15 inserted into the upper end of the tubular cage 6. At its outer extremity, the plug 15 is provided with a pointed head 16, defining a shoulder 17 against which the outer end of the tubular valve casing 6 abuts. The plug 15 and the cage 6 are of such a diameter that an opening exists between these elements and the rib 4, to the end that the liquid in the receptacle 1 may be poured out. At its inner end, the plug 15 terminates in a reduced spindle shaped tip 18. The tip 18 acts as a stop limiting the outward movement of the ball 10.

The coöperation between the tip 18 and the ball valve 10 is such that the latter cannot move outwardly, while the liquid is being poured, to a point opposite the openings 12, and consequently, the openings 12 remain unencumbered during the pouring operation. In the plug 15 there is formed an opening 19 adapted to be alined with the openings 14 in the side wall of the cage 6. Through these alined openings 19 and 14 may be inserted a spring 20, the ends of which are outwardly flexed to form spring pawls 21 adapted to engage beneath the shoulder 5.

The invention may include a stopper 22 inserted into the neck 2 of the receptacle and provided with a bore 23 which receives the pointed head 16 of the plug 15 and effects a closure of the outer end of the neck.

In order to assemble the device, the plug 15 is thrust into the open end of the cage 6 and the openings 14 and 19 are alined. Through these openings the spring 20 is inserted, the ends of the spring being bent slightly to form the pawls 21. The valve casing thus formed is thrust into the neck of the bottle and the pawls 21 expand beneath the shoulder 5 and prevent the valve casing from moving outwardly. Inward movement of the casing is prevented by reason of the fact that the shoulder 11 engages with the rib 3.

The ball valve 10 acts as a closure for the opening 9 and tends to prevent the unauthorized introduction of liquid into the receptacle 1. When, however, the receptacle is inclined, the ball valve 10 will become unseated, whereupon the liquid in the bottle 1 will flow outwardly through the opening 9, the openings 12 and through the space existing between the valve casing and the rib 4. Owing to the fact that the plug 15 terminates in the outwardly extended, pointed head 16, it will be difficult to introduce a tube into the neck of the bottle and fill the bottle under pressure.

Especial attention is directed to the fact that upon the exterior surface of the neck and adjacent the mouth thereof, a plurality of longitudinally extended superficial grooves 24 are formed. If a filling tube is placed around the outside of the neck 2, these grooves 24 will act as pressure vents and relieve the pressure within the filling tube to such an extent that it will be difficult to force the liquid into the receptacle past the seated valve 10.

Passing to the modification depicted in Fig. 6, the receptacle is shown at 25 and the neck thereof is denoted by the reference character 26. The primary rib appears at 27 and the secondary rib is shown at 28, the shoulder of the latter being indicated at 29. The superficial grooves on the neck appear at 30. The cage 31 is formed integrally with the plug 32, the same including a tapered head 33. A transverse opening 34 is formed in the plug and through this opening 34 is inserted a spring 35, the ends of which constitute pawls 36 interlocking with the shoulder 29. The lateral openings in the cage appear at 37, the stop shoulder is shown at 38, the reduced end of the cage is shown at 39, the same being contracted as shown at 40 and being provided with an opening 41 receiving the ball 42. In the place of the reduced tip 18, the valve stop takes the form of a cross pin 43 mounted in the side walls of the cage. The stopper is shown at 44 and is provided with a recess 46 receiving the head 33. If desired, the stopper 44 may be supplied with a transverse opening 46 which is useful when it is desired to pry the stopper out of the bottle.

As shown in Fig. 7, the valve casing appears at 47 and is provided with lugs 48 which act as stops limiting the outward movement of the ball valve.

The spring 20, the stop pin 43 and any other constituent portions of the device which may be made of metal, may be coated with any suitable substance to prevent rusting and deterioration. The valve casing, whether in the form shown in Fig. 6 or of the form shown in Fig. 1 preferably is made of glass, porcelain or some other material which will not be attacked by the contents of the receptacle 1.

Having thus described the invention, what is claimed is:—

In a non-refillable bottle, a receptacle provided with a primary rib, and with a secondary rib adjacent its mouth; a valve casing extended into the primary rib and provided with a shoulder engaging the primary rib, the casing having a lateral opening and being provided with an opening at its inner end, the casing between spaced peripherally from the secondary rib and being provided at its outer end with a pointed terminal; a ball valve located in the casing and coöperating with the opening at the inner end of the casing; a locking element extended through the casing and terminated in spring pawls engaged beneath the secondary rib; and a stopper having an opening receiving the pointed terminal of the casing.

In testimony that I claim the foregoing as my own, I have hereto affixed my signature in the presence of two witnesses.

JOSEPH LEMBERG.

Witnesses:
 EMANUEL PILLING,
 JOHN A. HALL.

Copies of this patent may be obtained for five cents each, by addressing the "Commissioner of Patents, Washington, D. C."